(12) United States Patent
Solell

(10) Patent No.: US 6,247,308 B1
(45) Date of Patent: Jun. 19, 2001

(54) BIDIRECTIONAL ROTARY MOTION-CONVERTER, WAVE MOTORS, AND VARIOUS OTHER APPLICATIONS THEREOF

(75) Inventor: Yedidia Solell, Tel Aviv (IL)

(73) Assignee: Worldwide Solutions Company, LLC, Forest Hills, NY (US)

( * ) Notice: Subject to any disclaimer, the term of this patent is extended or adjusted under 35 U.S.C. 154(b) by 0 days.

(21) Appl. No.: 09/550,494

(22) Filed: Apr. 17, 2000

(51) Int. Cl.$^7$ ..................................................... F03C 1/00
(52) U.S. Cl. ............................. 60/495; 60/398; 74/125.5
(58) Field of Search ............................. 60/497, 398, 495; 74/125.5

(56) References Cited

U.S. PATENT DOCUMENTS

| | | |
|---|---|---|
| 984,241 | 2/1911 | Russell . |
| 1,925,742 | 9/1933 | Bamber et al. . |
| 2,783,022 | 2/1957 | Salzer . |
| 3,631,670 | 1/1972 | Vassilakis . |
| 3,672,244 * | 6/1972 | Nasvytis ................................. 74/859 |
| 4,034,565 | 7/1977 | McVeigh . |
| 4,145,885 | 3/1979 | Solell . |
| 4,319,454 | 3/1982 | Lucia . |
| 4,469,955 | 9/1984 | Trepl, II . |
| 4,598,547 | 7/1986 | Danihel . |
| 4,718,231 | 1/1988 | Vides . |
| 4,838,025 | 6/1989 | Nelis . |
| 4,996,840 | 3/1991 | Marx . |
| 5,203,295 * | 4/1993 | Alexander ........................ 123/197.5 |
| 5,275,247 * | 1/1994 | Weisgerber et al. .............. 180/53.6 |
| 5,474,503 * | 12/1995 | Debler et al. ...................... 475/205 |
| 5,564,992 * | 10/1996 | Cunningham ...................... 475/257 |
| 5,860,320 * | 1/1999 | Crabb ...................................... 74/112 |

* cited by examiner

Primary Examiner—Hoang Nguyen

(57) ABSTRACT

Motion-converter apparatus for converting bidirectional rotary movements to unidirectional rotary movements includes: an input shaft for inputting the bidirectional rotary movements; an output shaft for outputting the unidirectional rotary movements, the output shaft having a longitudinal axis perpendicular to the longitudinal axis of the input shaft; a drive bevel gear coaxial with, and driven bidirectionally by, the input shaft; a pair of driven bevel gears coaxial with the output shaft and meshing with the drive bevel gear on opposite sides of the axis of the drive bevel gear so as to be driven bidirectionally thereby but in opposite directions with respect to the output shaft; and a pair of one-way clutches coupling the driven bevel gears to the output shaft such that both one-way clutches are effective to drive the output shaft only in one direction. Various applications of such apparatus are also described, including wave and tide motors, wind turbines and bidirectional-movement measuring devices.

18 Claims, 4 Drawing Sheets

BIDIRECTIONAL ROTARY MOTION-CONVERTER, WAVE MOTORS, AND VARIOUS OTHER APPLICATIONS THEREOF

FIELD AND BACKGROUND OF THE INVENTION

The present invention relates to motion-conversion apparatus, and particularly to apparatus for converting bidirectional rotary movements to unidirectional rotary movements. The invention is particularly useful in energy conversion apparatus, such as wave motors and wind turbines, for converting naturally-occurring energy to a useful form, and is therefore described below particularly with respect to such applications. The invention, however, is useful in many other applications, and is therefore also described below for purposes of example with respect to a measuring application for accumulating and measuring bidirectional movements of an object.

Naturally-occurring energy, such as the energy in the sea and in the wind, constitutes a vast reservoir of energy which has remained largely untapped to the present time despite the long-anticipated energy crisis looming in the future because of the depletion of fossil fuels and the pollution of the atmosphere produced by them. For example, the prior art is replete with descriptions of many different types of wave motors, e.g., as illustrated in U.S. Pat. Nos. 4,145,885; 2,783,022; 4,319,454; 4,469,955; 4,718,231; 4,996,840; and 4,838,025. However, despite the long-felt need, such sources of naturally-occurring energy have remained largely untapped primarily because of the high installation expenses required to construct such apparatus as compared to the amount of useful energy that can be extracted by such apparatus.

Another area in which there has been a pressing need is in the measuring of bidirectional movements of an object. For example, automotive vehicles are commonly equipped with distance meters which measure the distance travelled by the vehicle. Since the vehicle is normally moving only in the forward direction, the distance meter normally measures only the distance travelled in the forward direction. However, there are applications where it may be necessary or desirable also to measure the distance travelled by the vehicle, or other object, in the reverse direction, e.g., for monitoring the extent of operation of a vehicle, such as a tank, for routine maintenance purposes.

OBJECTS AND BRIEF SUMMARY OF THE INVENTION

An object of the present invention is to provide motion-converter apparatus of a relatively simple construction for converting bidirectional rotary movements to unidirectional rotary movements. Another object of the invention is to provide energy conversion apparatus for converting various sources of energy, such as wave energy, tide energy and wind energy, to a useful form. A still further object of the invention is to provide measuring apparatus for accumulating and measuring bidirectional movements.

According to one aspect of the present invention, there is provided motion-converter apparatus for converting bidirectional rotary movements to unidirectional rotary movements, comprising: an input shaft for inputting the bidirectional rotary movements; an output shaft for outputting the unidirectional rotary movements, the output shaft having a longitudinal axis perpendicular to the longitudinal axis of the input shaft; a drive bevel gear coaxial with, and driven bidirectionally by, the input shaft; a pair of driven bevel gears coaxial with the output shaft and meshing with the drive bevel gear on opposite sides of the axis of the drive bevel gear so as to be driven bidirectionally thereby but in opposite directions with respect to the output shaft; and a pair of one-way clutches coupling the driven bevel gears to the output shaft such that one of the one-way clutches is effective to drive the output shaft only in one direction, and the other of the one-way clutches is effective to drive the output shaft also only in the one direction.

According to one application described below, the output shaft is coupled to a measuring device for accumulating and measuring the bidirectional rotary movements of the input shaft. Such an apparatus is particularly useful in energy conversion apparatus, e.g., for converting wave energy, tide energy, or wind energy, to a useful form.

According to a second described application of the invention, the output shaft is coupled to a measuring device for accumulating and measuring the bidirectional rotary movements of the input shaft. Such an apparatus may be used, for example, in measuring the total distance travelled by a vehicle, e.g., a tank, not only in the forward direction but also in the reverse direction, e.g., for maintenance purposes.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF PREFERRED EMBODIMENTS

Figure 1:
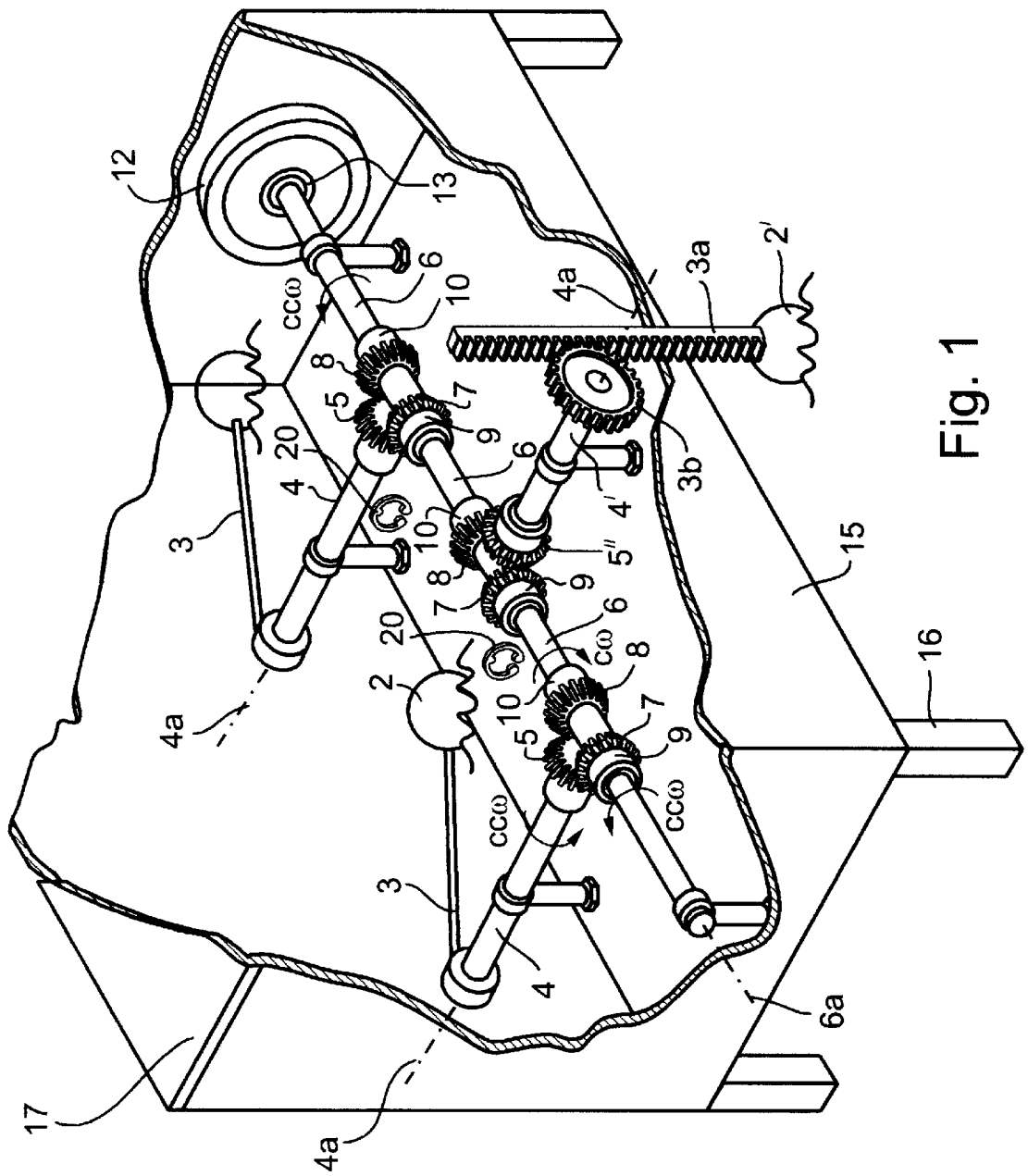
FIG. 1 is a three-dimensional view illustrating one form of motion-converter apparatus constructed in accordance with the present invention for harnessing the energy of the ocean waves or tides.

FIG. 1 illustrates a wave motor constructed in accordance with the present invention for converting wave or tide energy to useful energy. Such apparatus includes a plurality of floats 2 each coupled by a lever arm 3 to an input shaft 4 having a bevel gear 5 coaxial with its respective input shaft 4. It will thus be seen that the ascent of a float 2 will rotate its respective bevel gear 5 in one direction, and the descent of the float will rotate the respective bevel gear in the opposite direction.

These bidirectional rotations of the input shafts 4 and their respective bevel gears 5 are converted to a unidirectional rotation of an output shaft 6. For this purpose, the output shaft 6 is located such that its longitudinal axis 6a is perpendicular to the longitudinal axes 4a of all the input shafts 4. In addition, each of the bevel gears 5 of the input shafts 4 drives a pair of driven bevel gears 7, 8, each coaxial with the output shaft 6 and coupled to it by a one-way clutch 9, 10, respectively. As described below, the arrangement is such that the one-way clutches are effective to drive the output shaft 6 in only one direction.

Thus, in the example illustrated in FIG. 1, the ascent of a float 2 will rotate its respective input shaft 4 and drive bevel gear 5 in the counter-clockwise direction with respect to the longitudinal axis 4a of the input shaft. Driven bevel gear 7 is coupled to the drive bevel gear 5 on one side of the latter's axis 4a so as to be driven counter-clockwise by the counter-clockwise rotation of the input shaft 4; whereas driven bevel gear 8 is coupled to the drive bevel gear 5 on the opposite side of its axis 4a so as to be driven clockwise during the rotation of the respective input shaft.

In this example, the one-way clutches 9 and 10 couple their respective bevel gears 7, 8 to the output shaft 6 only during the counter-clockwise rotation of the bevel gear. Accordingly, during the ascent of each float 2, one-way clutch 9 will be effective to couple its driven bevel gear 7 to the output shaft 6 to rotate the latter shaft counter-clockwise, whereas one-way clutch 10 will decouple its respective bevel gear 8 from the output shaft. During the descent of a float 2, wherein the respective input shaft 4 is rotated clockwise, one-way clutch 9 will decouple its bevel gear 7 from the output shaft 6, whereas one-way clutch 10 will be effective to couple its bevel gear 8 to the output shaft. Accordingly, the output shaft 6 will be driven in only one direction, counter-clockwise in this example, both during the ascent and during the descent of the respective floats 2.

The unidirectional rotations of the output shaft 6 are used for driving a flywheel 12 coupled to the output shaft via a one-way clutch 13 effective to permit the flywheel to rotate only in the unilateral direction, namely counter-clockwise in the above-described example.

FIG. 1 also illustrates a variation wherein a float 2' is coupled to its respective input shaft 4', not via a lever arm 3 as described above, but rather via a rack 3a and pinion 3b mechanism. Input shaft 4' is also located perpendicularly to output shaft 6 and drives a bevel gear 5' coaxial with the input shaft, which in turn drives a pair of bevel gears 7 and 8 coaxial with the output shaft 6, via one-way clutches 9, 10, in the same manner as described above with respect to the pivotally-mounted floats 2.

It will be appreciated that a wave motor constructed in accordance with the present invention could include only floats mounted by lever arms to their respective input shafts as shown at 2–4, floats mounted to their respective input shafts by a rack and pinion mechanism as shown at 2'–4' FIG. 1, or various combinations of the foregoing according to the particular application.

As further shown in FIG. 1, the conversion mechanism is enclosed within a housing 15 mounted in any suitable manner, as by columns 16, over the body of water whose wave energy or tide energy is to be harnessed. The housing 15 is preferably dimensioned so as to enable access to the various parts by service personnel, and is preferably closed by a cover 17 to prevent the entry of water and thereby to reduce corrosion of the converter mechanism.

Figure 2:
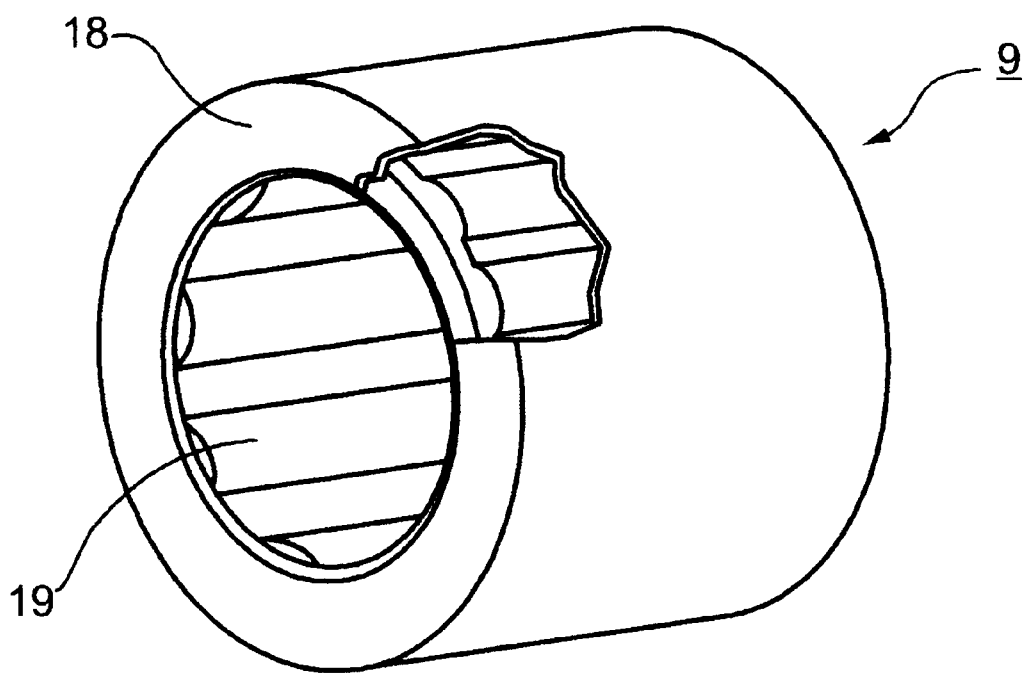
FIG. 2 is a three-dimensional view of the construction of one of the one-way clutches used in the apparatus of FIG. 1.

The one-way clutches 9, 10 are preferably roller clutches. FIG. 2 illustrates one such rotor clutch which is commercially available, including a thin-walled outer ring 18 carrying a plurality needle rollers 19 on its inner surface arranged in a series of ramps so as to transmit torques only in one direction. It will be appreciated, however, that other one-way clutches may be used, such as ball clutches. Preferably, They are press-fitted into cylindrical extensions formed in their respective bevel gears 7, 8.

Figure 3:
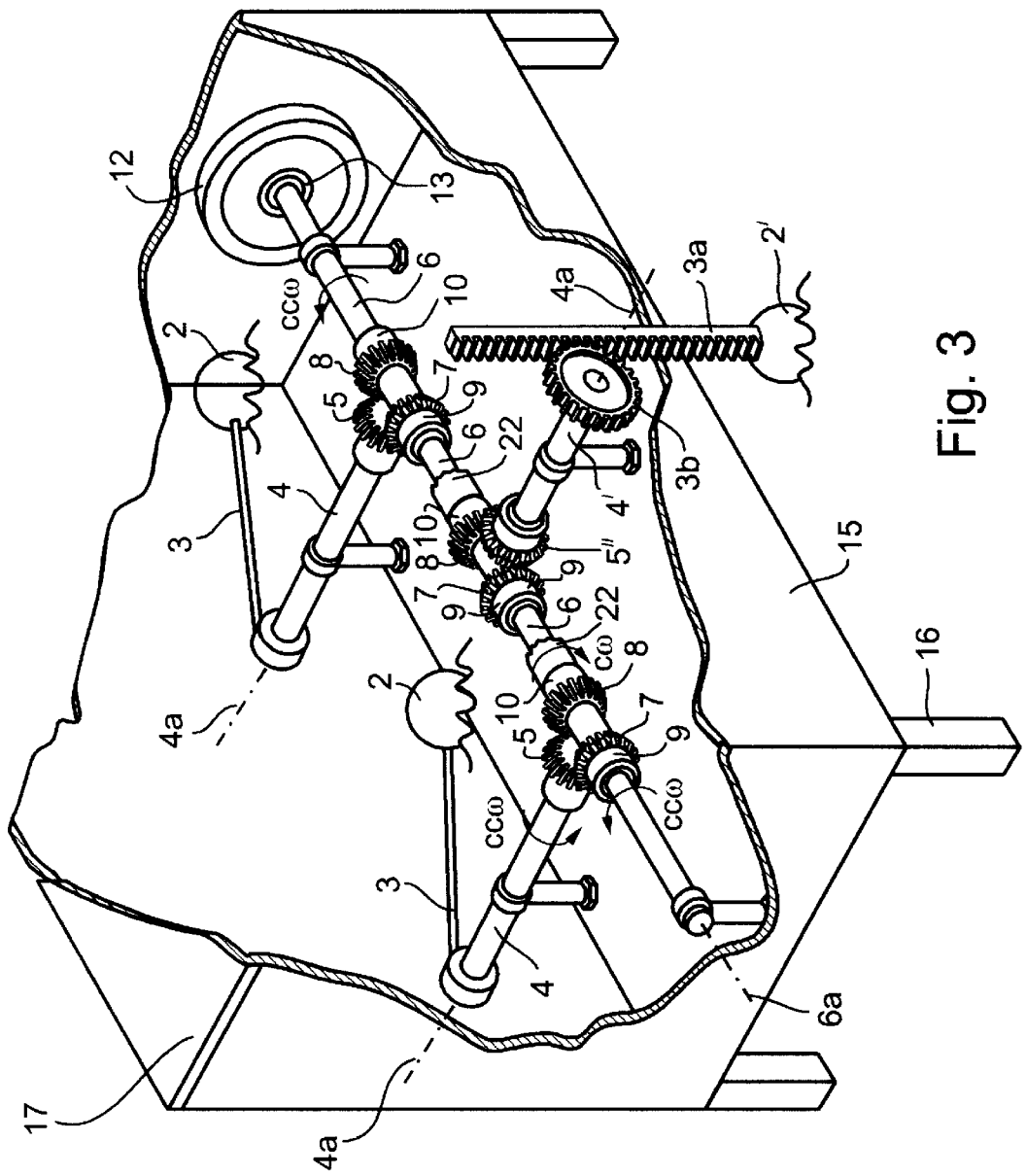
FIG. 3 is a view similar to that of FIG. 1 but illustrating a modification.

The bevel gears, together with their one-way clutches, are preferably retained in their respective locations on the output shaft 6 by retainer rings 20 (e.g., "Cirloc" rings) snapped into annular grooves formed in the output shaft. FIG. 3 illustrates a variation wherein these bevel gear and their respective one-way clutches are retained in place on the output shaft by spacer sleeves 22.

Figure 4:
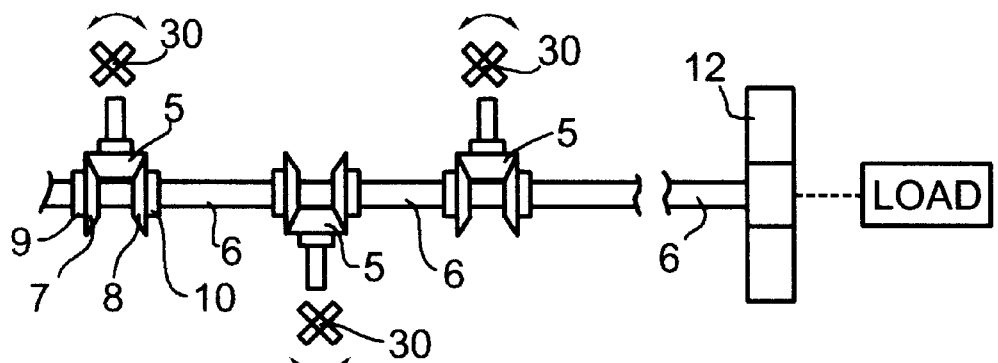
FIG. 4 is a top view of FIG. 1 but illustrating the apparatus used with wind turbines for harnessing wind energy.

FIG. 4 illustrates an application of the invention for harnessing wind energy. In this application, the energy sources are wind turbines 30 instead of floats 2. The mechanism is otherwise the same as described above, and therefore corresponding parts carry the same reference numerals to facilitate understanding.

Figure 5:
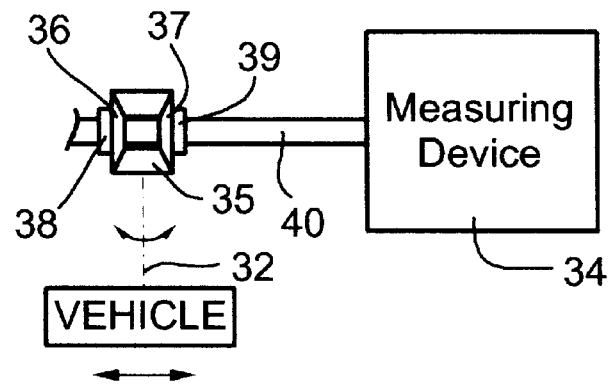
FIG. 5 is a top view illustrating another apparatus constructed in accordance with the present invention for measuring the bidirectional movements of a body, such as a vehicle, e.g., a tank.

FIG. 5 illustrates another application of the invention wherein the bidirectional movements of an input shaft 32 are accumulated and measured in a measuring device 34. Thus, each input shaft 32 is coupled to a drive bevel gear 35, which in turn is coupled to two driven bevel gears 36, 37, each coupled by a one-way clutch 38, 39 to an output shaft 40 directly coupled to the measuring device 34. The construction and operation of the apparatus illustrated in FIG. 5 are otherwise the same as described above with respect to FIG. 1. Such an apparatus may be used, for example, to measure the bidirectional movements of a vehicle, e.g., a tank, for maintenance record purposes or the like, as briefly described above.

Figure 6:
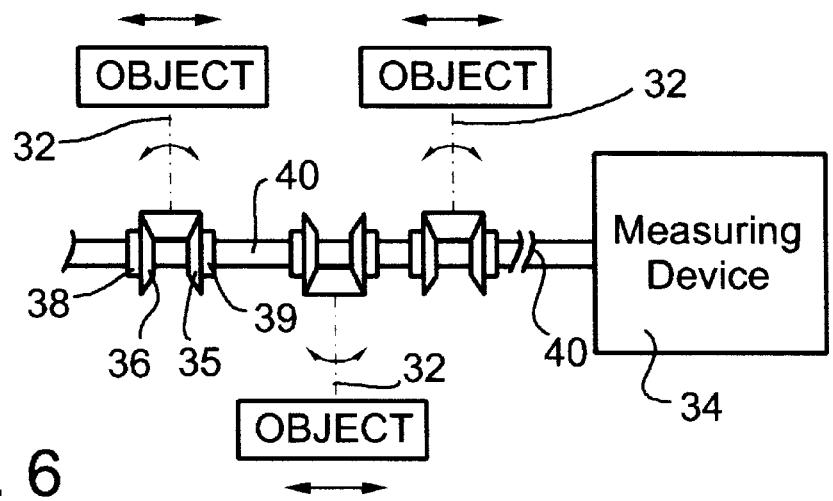
FIG. 6 is a view similar to that of FIG. 5 but illustrating the apparatus having a plurality of inputs for accumulating and measuring the bidirectional movements of a plurality of objects.

FIG. 6 illustrates another application of the apparatus shown in FIG. 5 wherein the unidirectionally-driven measuring device 34 accumulates and measures the bidirectional rotary movements of a plurality of input shafts 32 each coupled as described above to a common output shaft 40.

While the invention has been described with respect to several preferred embodiments, it will be appreciated that these are set forth merely for purposes of example, and that many other variations, modifications and applications of the invention may be made.

What is claimed is:

1. Motion-converter apparatus for converting bidirectional rotary movements to unidirectional rotary movements, comprising:

an input shaft for inputting the bidirectional rotary movements;

an output shaft for outputting said unidirectional rotary movements, said output shaft having a longitudinal axis perpendicular to the longitudinal axis of the input shaft;

a drive bevel gear coaxial with, and driven bidirectionally by, said input shaft;

a pair of driven bevel gears coaxial with said output shaft and meshing with said drive bevel gear on opposite sides of the axis of the drive bevel gear so as to be driven bidirectionally thereby but in opposite directions with respect to said output shaft;

and a pair of one-way clutches coupling said driven bevel gears to said output shaft such that one of said one-way clutches is effective to drive said output shaft only in one direction, and the other of said one-way clutches is effective to drive said output shaft also only in said one direction.

2. The apparatus according to claim 1, wherein said output shaft is coupled to a flywheel via a further one-way clutch effective to permit the flywheel to rotate only in said one direction.

3. The apparatus according to claim 1, wherein said output shaft is coupled to a measuring device for accumulating and measuring the bidirectional rotary movements of said input shaft.

4. The apparatus according to claim 1, wherein there are a plurality of said input shafts for converting bidirectional movements thereof to unidirectional movements in said output shaft; each of said input shafts being oriented perpendicularly to said output shaft and being coupled thereto at longitudinally spaced locations thereof by a said drive bevel gear driving a said pair of driven bevel gears coupled to said output shaft by a said pair of one-way clutches at each of said locations of the output shaft.

5. The apparatus according to claim 4, wherein said output shaft is coupled to a flywheel via a further one-way clutch effective to permit the flywheel to rotate only in said one direction.

6. The apparatus according to claim 5, wherein at least some of said input shafts are coupled to a float to float on a body of water and thereby to convert wave and/or tide energy of said body of water to rotary energy of said flywheel.

7. The apparatus according to claim 6, wherein at least some of said floats are coupled to their respective input shafts by a lever arm effective to rotate the input shaft in one direction during the ascent of the float, and in the opposite direction during the descent of the float.

8. The apparatus according to claim 6, wherein at least some of said floats are coupled to their respective input shafts by a rack and pinion mechanism effective to rotate the input shaft in one direction during the ascent of the float, and in the opposite direction during the descent of the float.

9. The apparatus according to claim 5, wherein each of at least some of said input shafts is coupled to a wind turbine to be exposed to wind, and thereby to convert wind energy to rotary energy of said flywheel.

10. The apparatus according to claim 4, wherein said output shaft is coupled to a measuring device for accumulating and measuring the bidirectional rotary movements of said input shafts.

11. Energy conversion apparatus for converting energy of an energy source to a useful form, comprising:

an energy source;

an input shaft coupled to said energy source so as to be rotated bidirectionally thereby;

an output shaft having a longitudinal axis perpendicular to the longitudinal axis of the input shaft;

a drive bevel gear coaxial with, and driven bidirectionally by, said input shaft;

a pair of driven bevel gears coaxial with said output shaft and meshing with said drive bevel gear on opposite sides of the axis of the drive bevel gear so as to be driven bidirectionally thereby but in opposite directions with respect to said output shaft;

a pair of one-way clutches coupling said driven bevel gears to said output shaft such that one of said one-way clutches is effective to drive said output shaft only in one direction, and the other of said one-way clutches is effective to drive said output shaft also only in said one direction;

and a flywheel coupled to said output shaft via a further one-way clutch effective to permit the flywheel to rotate only in said one direction.

12. The apparatus according to claim 11, wherein there are a plurality of said energy sources and input shafts for converting bidirectional movements thereof to unidirectional movements in said output shaft; each of said input shafts being oriented perpendicularly to said output shaft and being coupled thereto at longitudinally spaced locations thereof by a said drive bevel gear driving a said pair of driven bevel gears coupled to said output shaft by a said pair of one-way clutches at each of said locations of the output shaft.

13. The apparatus according to claim 12, wherein at least some of said energy sources are floats.

14. The apparatus according to claim 13, wherein at least some of said floats are coupled to their respective input shafts by a lever arm effective to rotate the input shaft in one direction during the ascent of the float, and in the opposite direction during the descent of the float.

15. The apparatus according to claim 13, wherein at least some of said floats are coupled to their respective input shafts by a rack and pinion mechanism effective to rotate the input shaft in one direction during the ascent of the float, and in the opposite direction during the descent of the float.

16. The apparatus according to claim 12, wherein at least some of said energy sources are wind turbines.

17. Motion measuring apparatus for accumulating and measuring bidirectional movements of an object, comprising:

an input shaft coupled to said object so as to be rotated bidirectionally by the bidirectional movements of the object;

an output shaft having a longitudinal axis perpendicular to the longitudinal axis of the input shaft;

a drive bevel gear coaxial with, and driven bidirectionally by, said input shaft;

a pair of driven bevel gears coaxial with said output shaft and meshing with said drive bevel gear on opposite sides of the axis of the drive bevel gear so as to be driven bidirectionally thereby but in opposite directions with respect to said output shaft;

a pair of one-way clutches coupling said driven bevel gears to said output shaft such that one of said one-way clutches is effective to drive said output shaft only in one direction, and the other of said one-way clutches is effective to drive said output shaft also only in said one direction;

and a measuring device coupled to said output shaft for accumulating and measuring the bidirectional rotary movements of said input shaft.

18. The apparatus according to claim 17, wherein there are a plurality of said objects and input shafts for converting bidirectional movements thereof to unidirectional movements in said output shaft; each of said input shafts being oriented perpendicularly to said output shaft and being coupled thereto at longitudinally spaced locations thereof by a said drive bevel gear driving a said pair of driven bevel gears coupled to said output shaft by a said pair of one-way clutches at each of said locations of the output shaft.

* * * * *